Sept. 19, 1950

R. H. GODDARD 2,523,011

COOLING AND FEEDING MEANS FOR
ROTATING COMBUSTION CHAMBERS

Filed Nov. 1, 1947

INVENTOR.

Robert H. Goddard, Dec'd.
Esther C. Goddard, Executrix.
BY Chas. T. Hawley
ATTORNEY Patented Sept. 19, 1950

2,523,011

UNITED STATES PATENT OFFICE 2,523,011

COOLING AND FEEDING MEANS FOR ROTATING COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application November 1, 1947, Serial No. 783,593

2 Claims. (Cl. 60—35.6)

This invention relates to combustion apparatus of the general type in which a rotating combustion chamber is provided with a rearwardly open discharge nozzle.

It is the general object of the present invention to provide a rotating combustion chamber having improved means for centrifugally feeding combustion liquids to said chamber and for cooling the walls of said chamber.

Provision is also made for centrifugally supplying a tangential film of a cooling liquid within the combustion chamber and for jacketing and cooling the discharge nozzle. A novel construction of hollow liquid-cooled spiral vanes is also provided in the nozzle for rotating the combustion chamber.

The invention further relates to arrangements and combinations of parts which will be hereinafter described and more particularly pointed out in the appended claims.

A preferred form of the invention is shown in the drawing, in which.

Figure 4:
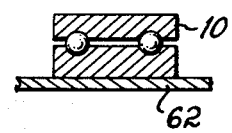

Referring to the drawing, a combustion chamber C is shown, which is supported for rotation in roller bearings indicated at 10 and 11 and shown in detail in Fig. 4.

The combustion chamber C comprises a conical upper inner wall portion 20 and a reversed conical lower inner wall portion 22. The adjacent edge portions 23 and 24 of the wall portions 20 and 22 are spaced apart to provide an annular recess 25 within which mixing of the combustion liquids may take place.

An outer wall portion 30 encloses a conical recess 31 outside of the wall portion 20, and a conical outer wall portion 34 encloses a conical recess 35 outside of the wall portion 22.

Figure 3:
Figs. 3 and 4 are detail sectional views to be described.

A combustion liquid, as liquid oxygen, may be fed through a pipe or nozzle 40 to the upper end of the recess 31, and the lower edge portion 23 of the inner wall portion 20 is provided with openings 41 (Fig. 3) through which the liquid oxygen may be sprayed into the mixing recess 25. The upper inner wall portion 20 has a tubular upward extension 44 surrounded by an annular opening 45 through which the liquid oxygen is supplied.

A second combustion liquid, as gasoline, is supplied from a pipe or nozzle 50 through an annular opening 51 at the lower end of the annular recess 35, and this liquid fuel is sprayed into the mixing recess 25 through openings 52.

Radiating vanes 55 are provided in the upper recess 31, by which vanes the liquid oxygen is given a whirling motion and is caused to flow toward the spray openings 41 by centrifugal force. Such vanes are shown in detail in Fig. 3 of Goddard Patent No. 2,395,403, issued February 26, 1946. Similar partitions 57 are provided in the annular recess 35, by which vanes the gasoline is caused to flow by centrifugal force toward the spray openings 52.

The two combustion liquids are effectively mixed in the annular recess 25 and may be ignited in the combustion chamber C by any suitable igniting device 60.

Figure 2:
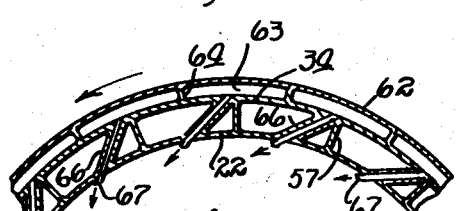
Fig. 2 is an enlarged fragmentary sectional view, taken along the line 2—2 in Fig. 1.

An outer jacket 62 encloses a recess 63 outside of the upper outer wall 30, and this recess is provided with radiating partitions 64 (Fig. 2) by which water delivered through a pipe or nozzle 65 is caused to flow to a plurality of tubes 66 which extend tangentially through the upper end of the recess 35 and supply water in tangential streams to spray openings 67 in the lower inner wall portion 22.

The rapid rotation of the spray tubes, causes the injected water to form a rotating cooling film on the inner wall of the combustion chamber and to thus protect the wall from the very high temperature of the combustion gases.

It is desirable that the tubes 66 pass through the recess 35 containing gasoline, rather than through the recess 31 containing liquid oxygen, as otherwise the water would freeze and plug the tubes before it reached the combustion chamber.

Figure 1:
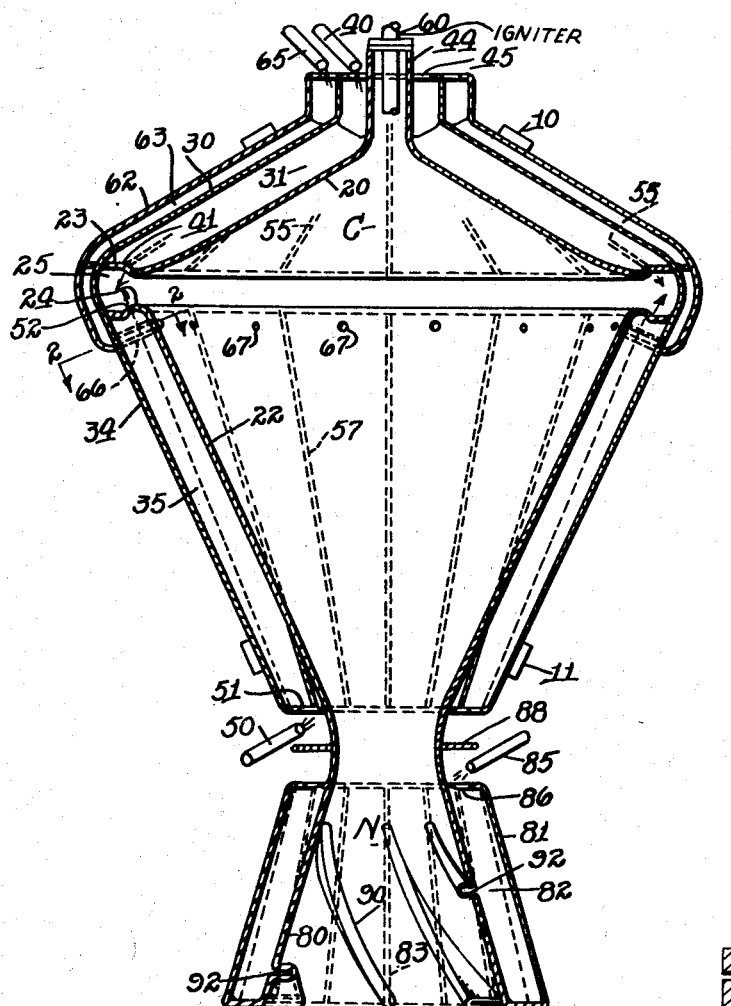
Fig. 1 is a sectional elevation of a combustion chamber showing the invention.

The conical wall 80 of the nozzle N is preferably displaced inward as indicated in Fig. 1 to form hollow spiral vanes 90, which vanes react with the combustion gases to rotate the combustion chamber as the gases are discharged through the nozzle. These hollow vanes 90 communicate through lengthwise-extending slots 92 with the annular recess 82 containing cooling liquid, and the hollow vanes 90 are open at their lower ends as indicated at 94 for discharge of the cooling liquid or vapor. The vanes 90 are thus effectively cooled, and the cooling liquid is conveniently discharged into the gas stream.

Very effective provision is thus made for feeding combustion liquids to the chamber C under centrifugal force and for feeding a cooling liquid as water to the jacket spaces 63 and 82. Effective provision is also made for thoroughly mixing the sprays of combustion liquids and for supplying the mixed liquids and vapors to the combustion chamber C. The specific construction of the jacketed nozzle and certain cooling and chamber-rotating features associated therewith is not claimed herein but forms the subject matter of a divisional application Serial No. 132,356, filed December 10, 1949.

Having thus described the invention and the advantages thereof, it will be understood that the invention is not to be limited to the details herein disclosed, otherwise than as set forth in the claims, but what is claimed is:

1. In a rotating combustion chamber having reversed conical front and rear inner wall portions which are spaced apart at their adjacent and larger-diameter edges to provide an annular mixing recess, a rearwardly-open discharge nozzle for said chamber, outer casing members spaced from said inner wall portions to provide reversed annular conical jacket spaces, means to feed liquid fuel and a liquid oxidizer to the remote ends of said jacket spaces which are of smaller diameter, and means to deliver sprays of said liquids from the adjacent and larger-diameter ends of said jacket spaces to said annular mixing recess, that improvement which consists in providing an additional casing which encloses an additional outer jacket space surrounding the previously-defined jacket space at the front end of said combustion chamber, and in providing means to supply said additional outer jacket space with cooling water at its smaller end, and in providing means to conduct portions of said water from said outer jacket space to the interior of said combustion chamber to cool the walls thereof.

2. The combination in a rotating combustion chamber as set forth in claim 1, in which feeding tubes connect said outer jacket space to said combustion chamber, and in which said tubes traverse the jacket space containing liquid fuel in a tangential direction.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|--------|------|------|
| 2,217,649 | Goddard | Oct. 8, 1940 |
| 2,354,151 | Skoglund | July 18, 1944 |
| 2,395,114 | Goddard | Feb. 19, 1946 |
| 2,408,112 | Truax et al. | Sept. 24, 1946 |